US010771471B2

(12) United States Patent
Enqvist et al.

(10) Patent No.: US 10,771,471 B2
(45) Date of Patent: Sep. 8, 2020

(54) METHOD AND SYSTEM FOR USER AUTHENTICATION

(71) Applicant: COMPTEL OYJ, Helsinki (FI)

(72) Inventors: Juhana Enqvist, Espoo (FI); Jyrki Berg, Lohja (FI)

(73) Assignee: Comptel Oyj, Helsinski (FI)

( * ) Notice: Subject to any disclaimer, the term of this patent is extended or adjusted under 35 U.S.C. 154(b) by 298 days.

(21) Appl. No.: 15/295,329

(22) Filed: Oct. 17, 2016

(65) Prior Publication Data

US 2017/0034183 A1 Feb. 2, 2017

Related U.S. Application Data

(63) Continuation of application No. PCT/EP2015/058347, filed on Apr. 17, 2015.

(30) Foreign Application Priority Data

Apr. 17, 2014 (EP) .................................. 14165160

(51) Int. Cl.
G06F 21/31 (2013.01)
H04L 29/06 (2006.01)
H04L 29/08 (2006.01)

(52) U.S. Cl.
CPC ............ H04L 63/105 (2013.01); G06F 21/31 (2013.01); G06F 21/316 (2013.01); H04L 63/08 (2013.01);
(Continued)

(58) Field of Classification Search
CPC ................................ G06F 21/316; G06F 21/31
See application file for complete search history.

(56) References Cited

U.S. PATENT DOCUMENTS 7,908,645 B2    3/2011  Varghese et al.
8,286,227 B1    10/2012 Zheng
(Continued)

FOREIGN PATENT DOCUMENTS

CN      101711029 A    5/2010
CN      103051619 A    4/2013
(Continued)

OTHER PUBLICATIONS

International Preliminary Report on Patentability (Chapter II of the Patent Cooperation Treaty) issued by the European Patent Office in relation to International Application No. PCT/EP2015/058347 dated Jun. 10, 2016 (5 pages).

(Continued)

Primary Examiner — Thaddeus J Plecha

(57) ABSTRACT

A method for user authentication in a telecommunication network includes an authentication server with an authentication service and comprises an initial identity check of a upon a user request. The method includes steps performed by the authentication server, in which steps the authentication server receives a request with user behavior data for further authentication of a user, stores the user behavior data, matches the initial identity with previous information of the user by using an algorithm, performs further checking of the identity of the user if the initial identity of the user and the previous information of the user did not match in a predetermined manner, and reports the result of the further authentication as a reply to the request. A system performs the steps of the method.

23 Claims, 5 Drawing Sheets

(52) U.S. Cl.
CPC .......... *H04L 63/083* (2013.01); *H04L 63/102* (2013.01); *H04L 67/22* (2013.01)

(56) References Cited

U.S. PATENT DOCUMENTS

| | | | | |
|---|---|---|---|---|
| 8,613,064 | B1* | 12/2013 | Roy | G06F 21/316 |
| | | | | 380/247 |
| 9,106,687 | B1* | 8/2015 | Sawhney | H04L 63/1416 |
| 9,185,095 | B1* | 11/2015 | Moritz | H04L 63/102 |
| 2007/0056022 | A1 | 3/2007 | Dvir | |
| 2007/0067853 | A1* | 3/2007 | Ramsey | G06F 21/316 |
| | | | | 726/28 |
| 2007/0236330 | A1 | 10/2007 | Cho et al. | |
| 2008/0113787 | A1* | 5/2008 | Alderucci | G06F 21/316 |
| | | | | 463/29 |
| 2011/0016534 | A1 | 1/2011 | Jakobsson et al. | |
| 2012/0011575 | A1* | 1/2012 | Cheswick | G01S 19/14 |
| | | | | 726/5 |
| 2013/0055368 | A1 | 2/2013 | Bauckman et al. | |
| 2013/0104203 | A1 | 4/2013 | Davis et al. | |
| 2013/0117358 | A1* | 5/2013 | Ricard | G06F 21/316 |
| | | | | 709/203 |
| 2013/0254885 | A1* | 9/2013 | Devost | G06F 21/56 |
| | | | | 726/23 |
| 2014/0007179 | A1* | 1/2014 | Moore | G06F 21/316 |
| | | | | 726/1 |
| 2014/0282964 | A1* | 9/2014 | Stubblefield | H04L 63/0853 |
| | | | | 726/7 |
| 2014/0313007 | A1* | 10/2014 | Harding | G07C 9/37 |
| | | | | 340/5.52 |
| 2014/0366111 | A1* | 12/2014 | Sheller | H04L 63/08 |
| | | | | 726/7 |
| 2015/0089568 | A1* | 3/2015 | Sprague | H04L 63/0876 |
| | | | | 726/1 |
| 2015/0278504 | A1* | 10/2015 | Azim | G06F 21/44 |
| | | | | 726/3 |
| 2016/0162683 | A1* | 6/2016 | Gibson | G06F 21/44 |
| | | | | 726/17 |

FOREIGN PATENT DOCUMENTS

| | | |
|---|---|---|
| RU | 2009139641 A | 5/2011 |
| WO | WO-2008134351 A1 | 11/2008 |
| WO | WO-2011/001026 A1 | 1/2011 |
| WO | WO-2011001026 A1 | 1/2011 |

OTHER PUBLICATIONS

International Search Report issued by the European Patent Office in relation to International Application No. PCT/EP2015/058347 dated Jul. 9, 2015 (4 pages).

Written Opinion of the International Searching Authority issued by the European Patent Office in relation to PCT/EP2015/058347 dated Jul. 9, 2015 (6 pages).

Russian Office Action issued by the Russian Patent Office in connection with Russian Application No. 2016144759/08(071829) dated Oct. 8, 2018 (6 pages) along with English language translation (5 pages).

Search Report issued by the Federal Institute of Industrial Property of the Federal Service on Industrial Property, Patents and Trade Marks in connection with Russian Application No. 2016144759/08(071829) dated Oct. 5, 2018 (2 pages) along with English language translation (2 pages).

* cited by examiner

| Object classification | Parameter | Profile USER1 Name Contact info | Profile USER2 Name Contact info | Profile USER3 Name Contact info |
|---|---|---|---|---|
| 1 | Device | 1.1. IPhone | 1.2. Samsung Galaxy | 1.3. HTC Model X |
| 2 | Device location for service use | 2.1. Home address | 2.2. Work address | 2.3. On the road (within certain area) |
| 3 | One-time duration | 3.1. 1h | 3.2. 0,5h | 3.3. 15 min |
| 4 | Time of day | 4.1. 6 p.m. | 4.2. 1 p.m. | 4.3. 10 a.m. |
| 5 | amount of money used | 5.1. 50€ | 5.2. 80€ | 5.3. 200€ |
| 6 | 1st category of visited site | 6.1. Music store | 6.2. Game playing site | 6.3. Sport items |
| 7 | 1st category of purchased product | 7.1. CDs | 7.2. Tickets | 7.3. Sport clothes |
| 8 | 2nd category of visited site | 8.1. news subscription | 8.2. Ticket store | 8.3. Social media site |
| 9 | 2nd category of purchased product | 9.1. Book | 9.2. Electronics for music | 9.3. Sport socks |

FIG. 3

METHOD AND SYSTEM FOR USER AUTHENTICATION

CROSS-REFERENCE TO RELATED APPLICATIONS

The present application is a continuation of PCT Application No. PCT/EP2015/058347 filed Apr. 17, 2015, which claims priority to European Patent Application Serial No. 14165160.4 filed Apr. 17, 2014, the entire disclosure of each of which is incorporated herein by reference in their entirety.

TECHNICAL FIELD

The invention is concerned with a method and system for user authentication in a telecommunication network comprising an authentication server with an authentication service. The method involves initial identity check of the user upon a user requesting the user service.

BACKGROUND INFORMATION

Because the Internet is easily accessible to anyone, the use of it involves different kinds of risks. Without any security actions the persons dealt with are not known and personal information might be spread out and made use of.

Examples of internet risks are identity thieves that use information they find online to drain bank account or ruin credit ratings. Generally, information on people in e.g. popular social networking sites might be misused or used in an undesired way for a user even resulting in m monetary losses for people.

Authentication and actions for data privacy are therefore used as methods to increase security. The ability to control the information one reveals about oneself over the Internet, and who can access that information, has become a growing concern. Another concern is web sites which collect, store, and possibly share personally identifiable information about users.

Information privacy, or data privacy (or data protection), is the relationship between collection and dissemination of data, technology, the public expectation of privacy, and the legal and political issues surrounding them. Legislation with respect to protection of people's privacy is becoming stricter around the world and along with the risks with e.g. the use of internet, people are getting more and more interested in the protection of their own privacy.

Privacy concerns exist wherever personally identifiable information is collected and stored—in digital form or otherwise. Improper or non-existent disclosure control can be the root cause for data and other privacy issues.

Also authorization (or authorisation), which is the function of specifying access rights to resources, is related to information security and computer security in general and to access control in particular. More formally, "to authorize" is to define access policy. During operation, the system uses the access control rules to decide whether access requests from (authenticated) consumers shall be approved (granted) or disapproved (rejected).

Authentication is used as a defense against unauthorized access to a service provided by a service provider or to a communication network. Information is exchanged to verify the identity of a user. The information can be encrypted at both ends. Authentication over a network is an especially important part for enabling security when remote clients are allowed to access network servers.

Authentication over a data network, especially a public data network like the Internet, is difficult because the communication between the client and server is susceptible to many different types of attacks.

A basic authentication scheme is for a server to request a password from the client. A password is a secret word or string of characters that is used for user authentication. The client types in the password and sends it to the server. This technique is vulnerable to eavesdroppers who may learn secret information by intercepting communication between the client and the server. Captured information can also be used by a hacker in what is called a "replay attack" to illegally log on to a system.

Another type of attack is a spoofing attack, in which an adversary impersonates the server, so that the client believes that it is communicating with the legitimate server, but instead it is actually communicating with the adversary. Further, in any password based authentication protocol, there exists the possibility that passwords will be weak and even easily guessed such that they are susceptible to dictionary attacks. A dictionary attack is a brute force attack on a password that is performed by testing a large number of likely passwords.

One solution to avoid attacks with replaying captured reusable passwords is to use one-time passwords (OTP). A one-time password can e.g be one password in a set of passwords, so constructed that it is extremely difficult to calculate the next password in the set or a one-time password system granting the visitor access for a limited time, e.g. one day.

Generally, authentication can be accomplished by verifying one or more of a password or PIN (something that a user knows, i.e. a knowledge factor), biometric information (something that a user is, such as a fingerprint, voiceprint or iris, i.e. an inherence factor), and some identification token, such as a smart-card or mobile phone (something that a user has, i.e. a possession factor). Multi-factor authentication, or two-factor authentication, is an approach to authentication which requires the presentation of two or more of the above mentioned three authentication factors. After presentation, each factor must be validated by the other party for authentication to occur.

As presented above, knowledge factors are the most common form of authentication as a basic authentication scheme.

Biometric authentication is usually unacceptably slow and comparatively expensive when a large number of users are involved. In addition, it is vulnerable to a replay attack. Voice biometrics, however, significantly reduce the risk of a successful replay attack but there is great user resistance to biometric authentication. Users resist having their personal physical characteristics captured and recorded for authentication purposes.

For many biometric identifiers, the actual biometric information is rendered into string or mathematic information. Comparison is therefore made between two data strings, and if there is sufficient commonality a pass is achieved. As it is a matter of choice of how much data to match, and to what degree of accuracy, all biometric devices, therefore, do not provide unambiguous guarantees of identity, but rather probabilities, and all may provide false positive and negative outputs. A bio-identifier can also be faked. For example, fingerprints can be captured on sticky tape and false gelatin copies made, or simple photos of eye retinas can be presented.

Two-factor authentication is commonly found in electronic computer authentication and seeks to decrease the probability that the requester is presenting false evidence of its identity. However, in reality, there are more variables to consider when establishing the relative assurance of truthfulness in an identity assertion than simply how many "factors" are used.

Other factors under debate are time and location. For example, two users (even perfect twins with cloned knowledge and tokens) cannot be in the same place at the same time.

Existing authentication methodologies involve the explained three types of basic "factors". Authentication methods that depend on more than one factor are more difficult to compromise than single-factor methods.

A new category of Two-Factor Authentication, TFA, tools transforms the PC user's mobile phone into a token device using SMS messaging, an interactive telephone call, or via downloadable application to a smartphone. Since the user now communicates over two channels, the mobile phone becomes a two-factor, two-channel authentication mechanism.

According to proponents, Multi-Factor Authentication, MFA, could drastically reduce the incidence of online identity theft, and other online fraud, because the victim's password would no longer be enough to give a thief permanent access to their information. However, many MFA approaches remain vulnerable to man-in-the-browser and man-in-the-middle attacks.

Another drawback of two-factor authentication that are keeping many approaches from becoming widespread is that some consumers have difficulty keeping track of a hardware token or a USB plug. Furthermore, many consumers do not have the technical skills needed to install a client-side software certificate.

As a result, adding a second factor to the authentication process typically leads to significant increase in costs for implementation and maintenance. Most hardware token-based systems are proprietary and charge an annual fee per user. Deployment of hardware tokens is logistically challenging since hardware tokens may get damaged or lost and issuance of tokens in large industries such as banking or even within large enterprises needs to be managed.

In addition to capital expenses (CAPEX), two-factor authentication often carries significant additional operational expense (OPEX). Software certificates and software toolbar approaches have been reported to have the highest support costs.

As a result of challenges with cost integration and user acceptance, true two-factor authentication is not yet widespread, although it can be found in certain sectors requiring additional security (e.g. banking, military).

Furthermore, two-factor authentication is not standardized. There are various incompatible implementations of it. Therefore, interoperability is a further issue. There exist many processes and facets to consider in choosing, developing, testing, implementing and maintaining an end-to-end secure identity management system, inclusive of all relevant authentication mechanisms and their technologies.

Pre-authentication methods use call information to verify the calling number and dialed number, respectively, before answering a call. Using callback for added security takes place so that after authentication is complete, the call is hang up and a call back is made, ensuring that the connection is made only with a trusted number.

New hacker techniques are developed and new security vulnerabilities in networks are found every day. Computer-based attacks are likely to continue. For governments, businesses and ordinary individuals, the threat of hacking has created a need for secure information systems and networks which has never been greater.

The above described problems indicate that there is a continuous need to develop new methods and aspects for ensuring secrecy in order to be one step before advanced hackers.

The aforementioned two- and multifactor authentication methods are effective in many situations but in certain situations additional layers of security are desired, especially such methods which allow extra costs and complicated signaling to be simultaneously avoided.

The following references are mentioned as prior art.

US patent application 2007/0056022 discloses a two-factor authentication method that employs user's Internet Protocol (IP) address associated with a service and/or authentication request and user details of the request with an Internet Service Provider (ISP) account. If there is an indication that the IP address was issued by an ISP to a user matching the user details, the user is authenticated.

US patent application 2013/0055368 discloses a multi-factor authentication method using a designated link in a notification to an intended recipient of the message. The designated link includes a unique identifier associated with the message. Upon receiving a request to access the message, the method authenticates the request. The authentication includes verifying whether the request corresponds to the designated link provided in the notification. If the request passes authentication, the method communicates the message.

U.S. Pat. No. 8,286,227 presents an enhanced multifactor authentication method by using a first and a second authentication factor for successful verification of the identity.

U.S. Pat. No. 7,908,645 presents a method for authenticating access requests from user devices, which are identified with fingerprint information and their associated risks of fraud are determined from past experience or with similar devices and from third party information. The determination applies a set of predetermined evaluation rules for authenticating access requests at the server. The evaluation rules provide a score reflecting the likelihood that a current request is a security problem. Decision tables are used for a hierarchically arranged security evaluation. The tables return a score of "0" in case all evaluated data items are present and "10" if no data item is present, the score of "10" indicating a high likelihood of fraud for the request. In case some data items are present and match but some data items are absent and do not match, the tables invokes further checks. The rules can be based on historical behavior of a particular user by giving a mismatch if the user suddenly changes habits and this might indicate malicious intent. The rules can also restrict logins based on input from $3^{rd}$ party database or black-listed IP addresses.

Instead of rule-based behavioral analysis, machine-learning algorithms can be used for determining the behavior. The algorithms automatically learn the behavioral patterns of each individual user, and any anomalies in behavior can be scored. The algorithms can automatically adjust the expected behavior according to the changes in user behavior, and use further authentication steps, like two-factor authentication, to strengthen the learning performance. The algorithms can also predict unforeseen behavioral attribute combinations as part of normal behavior unlike standard rule-based calculations, and also detect minute changes in the patterns as abnormal behavior.

The above method, however, requires certain pre-defined information for the algorithm to work properly.

The object of the method is a flexible two-factor or multi-factor authentication method that works in all situations.

SUMMARY

The method and system of the invention has the characteristics of the main claims.

The method of the invention for user authentication in a telecommunication network comprises an authentication server with an authentication service and comprises an initial identity check of a upon a user request. The method is mainly characterized by the following steps as performed by the authentication server, in which steps the authentication server receives a request with user behavior data for further authentication of a user, stores the user behavior data, matches the initial identity with previous information of the user by using an algorithm, performs further checking of the identity of the user if the initial identity of the user and the previous information of the user did not match in a predetermined manner, and reports the result of the further authentication as a reply to the request.

The system of the invention has means for performing the steps of the method of the invention.

The invention is also concerned with a computer program product that performs the steps of the method of the invention when run in a computer readable media.

The preferable embodiments have the characteristics of the sub claims.

Different score values can be defined to represent different authentication levels and a threshold score value selected for the user to represent an authentication level to pass in the matching, whereby the matching is performed by calculating a score value for the identity match. The score value is calculated on the basis of the number of parameters matching previous behavior in relation to the number of parameters matching or mismatching previous behavior. Deviations of one or more individual parameters can be taken into consideration in the calculation of the score value. The threshold score value represents an authentication level on the basis of how the service connected to is used. The threshold score value can be set by the service provider, a network operator providing the network connections for the user or the user himself.

The previous information being based on previous behavior patterns of a user received and collected from one or more service providers in connection with the user's use of services provided by these one or more service providers.

The request for further authentication can be a continuous feed comprising information of the behavior of the user requesting the service to be sent during the whole further authentication session. The user can request updating of the score value on the basis of updated user behavior information from the continuous feed. The score value for the user can be updated during one session of further authentication on the basis of updated user behavior information from the continuous feed.

The parameters are preferably dynamically selected for the matching on the basis of availability.

The authenticating can be combined with authorization of the user to the service requested by specifying different access rights to different resources and services in the form of different authentication levels to pass defined by different threshold score values.

The result of the further authentication can be sent as a reply to the request. The reply is to be meant as an answer or a response to the sender of the request optionally by using a reply function for the sending. In the preferable embodiments, the telecommunication network further comprises one or more service providers, whereby the request for further authentication is received by a service provider and the result of the matching is sent to the same service provider.

The authentication server is connected to a database with user profiles for each user and structured information of the use of services of users with relating data of the user and his way of using services, the information including data from use of services provided by different service providers.

In the database, the structured information comprises data categorized by means of parameters and sub-parameters in manageable objects. A parameter describes different aspects of the service used, such as user device used, user device location, online times, type of visited sites, shopping habits, type and characteristics of products purchased, and/or amount of money used. Each user profile comprises one or more authentication levels to pass consisting of a threshold score value to reach for a given service.

The algorithm for calculating the score value is based on the number of matching parameters or sub-parameters versus mismatching parameters or sub-parameters or a percentage of matching parameters or sub-parameters.

With the invention, more precise user identification can be made without other costly identification methods. With this approach, the usage of such other identification methods can significantly be diminished to a lot smaller number. The invention can also be designed to provide different security criteria for different services. For example participating in a forum discussion needs less security certainty compared to e.g. banking services.

In further embodiments of the invention, more secure authentication can be made, for example for users performing online shopping. For example when connecting a user to an online shopping site, a certain authentication level usually needs to be fulfilled. But if the shopping basket of user grows over a certain limit, the security level for the user can be increased in order to launch additional verifications before the purchase can be finalized.

In still further embodiments of the invention, the invention further collects information of shopping habits, objects of interests, parameters of objects purchased (like price, colour, technical data, favorite manufacturers and vendors. The invention enables following consumer behavior from more than one vendor since it allows combining information collected from several vendors.

Information of specific user profile behavior can be collected from multiple sources (such as service providers, the network operator and other sources) for calculating a score value to pass in the matching step, which score value is calculated based on parameters describing the user's ways of using services.

Previous information about e.g. the used device location for service usage, shopping habits, online times, devices used, type of sites used for services and/or type of products purchased can be taken into account when calculating the score value. Also sub-parameters for those products can be collected for calculating the score value. One such sub-parameter can, for example consist of typical characteristics of certain products purchased by a certain user. A user might for instance usually buy his electrical devices in black. If he then suddenly buys a pink device, the behavior will create an anomaly in the user profile and might launch additional security checks. Another sub-parameter can e.g. consist of the exact site address used for a given type of service.

Behavior information to be collected for the user profile can include for example usual locations for use of the user devices (e.g. home, office, often visited places), the type and brand of devices used (mobile phone, computer, tablet, . . . ), location and/or time information (separately or combined), normal online times, normal home PC use times, surfing habits, time of day, purchase trends of purchased products (books, devices, clothes, . . . ) parameters for a typical purchase (price range, colours, quality, manufacturers, product categories (detective stories, love stories, etc, . . . ), purchase habits (buying just a few things at a time verses buying multiple items, the information of how often a service is used, how the services are used, spending habits/(one time visit, typical time and day of usage), where the service usually is used. Further information might relate to the time spent with the service/location/device, social behavior.

As consumer behavior can be followed over longer time periods, the normal behavior of a consumer can be noted. A user might e.g. be impulsive, visit a web page several times before a purchase decision, compare prices and/or behave differently with different types of products.

All this information can be used to detect unusual behavior and to estimate demographics (age, gender, education level, etc), interests and wrongful use of the device/services.

Also the provider of the Internet connection (the network operator) can be involved by giving information to the authentication service of the invention. One parameter to be checked optionally is the user's IP address from which the service provider received the request for service usage. The provider of the internet connection is aware of the user's real IP address and if these two do not match there is probably a man-in-the middle attack and the service can be denied. The network operator can also tell the actual user behavior, which information contributes in analyzing whether the behavior is normal or whether there is a reason to suspect misuse.

This invention makes it possible for service providers to adjust the security requirements for their services, but it also creates the same possibility for the network operator and even the user. With multiple security requirements, the system needs to fulfill them all in the most secure solution before it can grant access. For example with extremely security sensitive information, the user might define his/her security requirements a lot higher than the service provider does and in that way demand a stronger authentication level for all of his/her actions.

In addition to be able to adjust his security or authentication level, the user can also determine his data privacy with this invention. The user can e.g. determine his settings to define the data that is allowed to be collected and analysed by the service providers. For example location and behavior information can be sensitive information for some people which they do not want to share with anyone. In such a case and for those users there might be additional authentication steps in the method of the invention.

Single sign-on (SSO) is a session/user authentication process that permits a user to enter a user ID and password in order to access multiple applications. It is a method used for access control of multiple related, but independent software systems. The process authenticates the users for all the applications they have been given rights to and eliminates further prompts when they switch applications during a particular session so that a user only has to log in once to gain access to all systems without being prompted to log in again at each of them.

In the invention, Single sign-on (SSO) can also be used as a portal to different Internet locations so that when the user logs in to the authentication service of the invention, the logging information can be used to log in to the web page of the service providers. This takes place so that along with the logging to the service, the service providers receives the information of the user's identity since the user data is connected to the service provider's system. In this stage, the continuous follow-up of the user behavior performed influences on the score level of the identification. At the log-in, the user gets a certain score value, which is forwarded to the service provider. As information is collected from each action of the user, the reliability of the identity can be more reliably evaluated the more actions there have been. Thus, it has to be noted that not only signings are followed, but also every user action after it is followed.

The authentication method of the invention can also be connected to authorization by specifying different access rights to different resources and services. For example, if a user just requests to read the information of his purchase history or have his saldo information, or even make some cheap purchases, a lower score or fewer additional authentication steps can be required than for purchasing products over a certain price limit or number. In other words, a part of the services might be accessed with lower security requirements. Next time, however, the score might have changed for this user, since more information has been collected from the user's service use. The score might either become lower or higher. If a score value has become low enough, additional authentication might be required for the access of a service even for normal user behavior. If, in contrary, the score value has become high enough, the user can be granted more rights within the service without additional authentication.

This method can also be used to screen possible spam e-mails, or other misuse or misdirection with electrical communication. Also network operators can use this kind of a system to spot possible misuse of mobile devices, like stolen or lost phones from radically changed user behavior. In these cases, the mobile operator could actually instruct the device holder to visit a store with the device or shut down the connection.

This method can also be used for verifying a user that uses public computers and for collecting information of e.g. the areas, where the users use computers, the information they provide, where they browse, and what they do in the network. These features can be used to check the profile in order to create additional guarantee for that the user to be authenticated is the correct person to use a certain account.

Therefore, our invention performs dynamic user identity analysis on the basis of different parameters available since there are no rigid rules for how the score value is calculated. The invention can use new information when it appears without the need to change the algorithm used in the method of the invention.

The invention can also take missing information into account as a parameter in the authentication. If information that normally is available is suddenly missing it might indicate misuse. Or vice versa, if a user normally does not want to share certain information it is suspect if the information suddenly is available.

The user might have certain standard privacy settings, which prohibits the sharing of certain information. If such information suddenly is present, there is a possible fraud going on. Different service providers might, however, have different ways of acting and the analysis can therefore consider also what limitations are possible with different service providers.

The service providers can from case to case decide themselves how strictly the score value is used but the user himself/herself can influence the process of authentication. The user can also link different services together by telling what service he/she uses and with what identification and thus make the linking easier. The user can set different authentication levels for different services or use only one general level or both.

The invention is preferably implemented as an independent server service in order to help service providers to authenticate their users. In this way, information from multiple sources can be used without the service providers giving any information of the users to each other, providing information only to the service, and for the sole reason to help each other authenticate users. The service providers using the service give similar information to the service and each of them gain of a bigger database compared to if they used only own information. The service providers do not share information directly with each other since the service only sends out the score value but no user data itself.

In the following, the invention is described more in detail to illustrate the invention by means of an embodiment of the invention by referring to figures. The detailed description is not meant to restrict the invention to the details of the examples described.

FIGURES

FIG. 3 is an example of a database structure useful in an embodiment of the invention.

DETAILED DESCRIPTION

Figure 1:
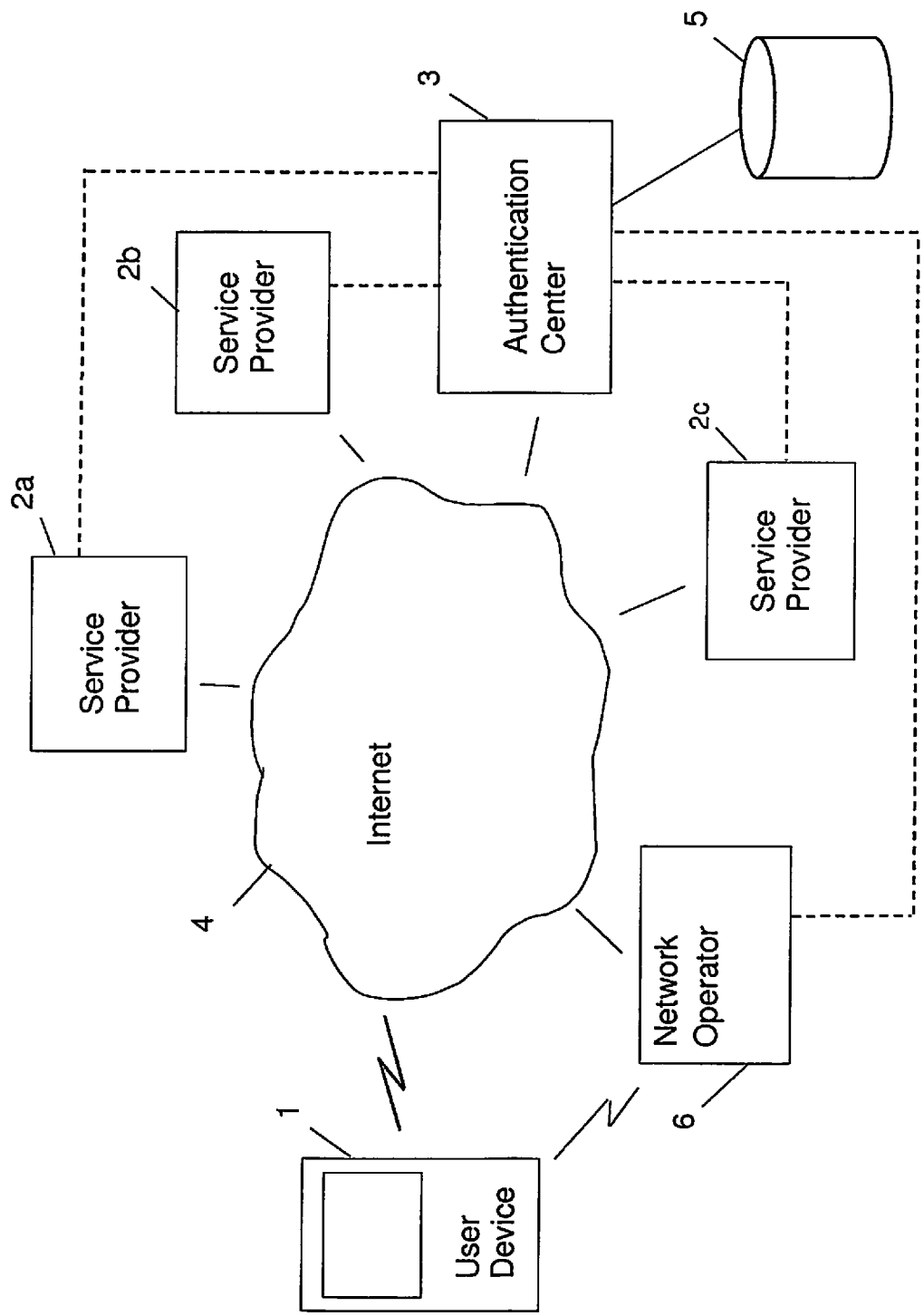
FIG. 1 is a view of a network, wherein the invention can be implemented.

FIG. 1 is an example view of a telecommunication network, wherein the invention can be implemented. The telecommunication network comprises a user device 1, service providers 2a, 2b, 2c providing services for users and an authentication server 3 with an authentication service and a network operator 6. The authentication server 3 provides the authentication service to the service providers 2a, 2b, 2c. All these entities mentioned are connected to the Internet 4 by means of a wired or wireless connection.

The authentication service can, however, also be implemented to work through a telephone network, such as the Global System for Mobile Communications (GSM).

With service provider (SP) is here meant a company that provides application services to users and companies through the Internet referring to a third party or outsourced supplier. The network operator 6 can be a mobile network operator or MNO, also known as a wireless service provider, being a provider of wireless communications services that owns or controls all the elements necessary to sell and deliver services to an end user including e.g. radio spectrum allocation, and wireless network infrastructures. It can also be an Internet provider. The dotted line drawn between the authentication server 3 and the network operator 6 shows that the network operator 6 communicates with the authentication server 3, e.g. when performing additional authentication by checking an IP address of a user. The network operator can also be any other type of communications service provider (landline or satellite for example). In some occasions, the network operator can also be seen as a service provider in this invention.

Dotted lines are drawn between the authentication server 3 and the service providers 2a, 2b, 2c to show that the service providers 2a, 2b, 2c communicate with the authentication server 3 and provides information to the authentication server 3 even if the communication takes place over the Internet. Of privacy reasons, the service providers 2a, 2b, 2c do not share user information and the authentication server 3 does not send user information to the service providers. In reality, there are usually much more user devices and service providers in the system of the invention but only one user device 1 and only three service providers 2a, 2b, 2c are indicated for illustrative purposes.

The authentication server 3 systematically collect information of different users into a database 5, in the register of which each user is connected to formatted information parameters describing the use of services of this particular user.

Figure 2:
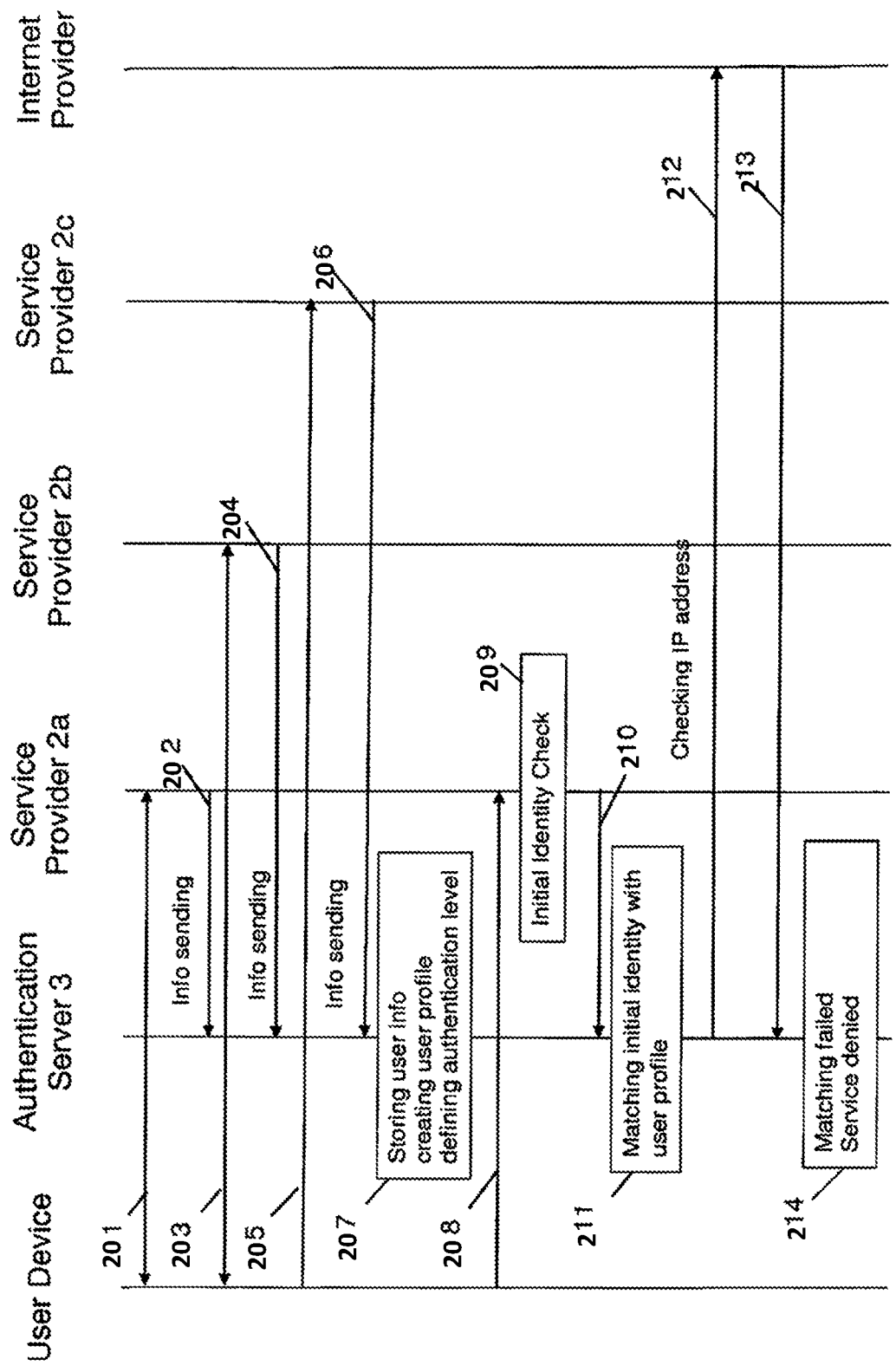
FIG. 2 is a sequence diagram of an example embodiment of the method of the invention.

FIG. 2 is a sequence diagram of an example embodiment of the method of the invention.

It is assumed that several service providers, (2a, 2b and 2c in FIG. 1, cooperate in sharing information with the authentication server and use its authentication service.

These service providers provide services for users with user devices that can communicate over a public network, like the Internet, with the service providers.

For illustrative purposes, only one user device is discussed in FIG. 2. In the example of FIG. 2, it is assumed that the user uses the services of all these three service providers by using his/her user device.

The communication between the user device and service provider 2a back is referred to as signal 201 in FIG. 2. The service provider 2a might use the same authentication service for an initial identity check. Before starting use of the authentication service of authentication server 3, the service provider probably uses other authentication services for authenticating its users. To be able to fully make use of the completed authentication check provided by authentication server 3, the authentication server should have information of previous user behavior. The service provider might have submitted this information to the authentication in advance or might submit it separately anytime. If the service provider already is a user of the authentication service of the authentication server 3, information of user behavior is advantageously submitted to the authentication server in connection with each authentication of the user after or upon the use of the service provided by the service provider or in connection with the use of the authentication service.

Thus, in FIG. 2, the service provider 2a informs the authentication server with signal 202 upon each service use of the user and gives data about how the user used the service including e.g. information of the device used by the user, the location of the device used for the service, the duration of the on-line time, the visited site, the purchased product or service, and the price of the product or service.

The corresponding communication between the user device and service provider 2b is referred to as signals 203 and 204 in FIG. 2 and that between the service provider 2c and the authentication server is referred to as signals 205 and 206 in FIG. 2.

In step 207, the authentication server stores the user information received in signals 202, 204 and 206 (or information that is separately sent) in a categorized and formatted way into a database. In the database, each user has a user profile with relating data of the user and his way of using services. An example of a way in which the parameters of the user information might be stored and categorized is shown as an example in FIG. 3.

The authentication server also stores one or more threshold values for this user to be used as authentication levels to pass. The threshold value can be defined e.g. by the user or the service provider. There might be different threshold values for different services and different products. The threshold value might depend on e.g. the price of the product, a limit for one-time purchases, type of service, the number of products to be purchased or any desired value on a certain parameter or sub-parameter. In the database, the services are categorized by means of parameters and sub-parameters in manageable objects for example in a way described in FIG. 3.

Next, it is assumed that the user now request a service from service provider 2a in signal 208.

For authentication of the user, the service provider first performs an initial identity check of the user. This might take place by using the same authentication server 3 or in some other way. Therefore, this step is just indicated as step 209 in the Figure.

In signal 210, the service provider 2a requests the authentication server to perform a further authentication check. In this signal, information of the service requested by the user is informed as well. The information comprises detailed data in the form of parameters for e.g. the device used, its location, the visited site, the purchased product or service, and the price of the product or service. The authentication server categorizes and stores this new data in the database as in step 207 (not shown).

An additional authentication check is performed by the authentication server 3 by matching the initial identity with a user profile. In the matching, available parameters and sub-parameters are matched against each other and depending on how many parameters and sub-parameters matched (and/or mismatched), a score value for example between 1 and 10 is calculated, 1 meaning e.g. the lowest degree of match and 10 the highest. This score value defines the degree of matching, i.e. the correspondence between current (newly received) parameters and previous parameters of the user.

Different algorithms can be constructed for the matching. An algorithm might e.g. simply be based on the number of matching parameters or sub-parameters versus mismatching parameters or sub-parameters or a percentage of matching parameters or sub-parameters. More weight can be given for parameters or sub-parameters considered important in the calculation of the score. Furthermore, parameters or sub-parameters that are considered important might be defined on user basis, for example because some users e.g. show more variation in their behavior. A detailed example of a matching base is explained in connection with FIG. 3, wherein it is explained that the data received is categorized by a hierarchic list of parameters and sub-parameters.

An authentication level was earlier (in this example in step 207) defined and stored in the form of a threshold score value to pass. This threshold score value can be different for different services and different users. The threshold score value can also be defined by the user or the service provider or them both.

For example, if a score value of 8 is required but the calculation in the matching step ended up to a score value of only 7, the system might require further identity check or it might just deny the service for the user directly, if e.g the score value is far from the accepted authentication level. Thus, there might be conditions for the score value to be close enough to the score value if the authentication level (describing degree of security) so that the system would allow further checks or alternatively, failed checks lead to some number of further checks.

In the example of FIG. 2, it is assumed that the score value calculated in step 211 did not pass the authentication level and therefore a further identity check is performed in signals 212 and 213. This is performed in FIG. 2 by checking the Internet Protocol, IP, address of the user device from the Internet provider (being the network operator). Optionally, for example a Short Message Service (SMS) check from the MNO (being the network operator for wireless services) can be made after the IP check if the IP check failed (not shown) or a check by Interactive Voice Response, and/or IVR, verification. The SMS check or IVR can also be an alternative to the IP check. Further alternatives or additional checks (not shown in FIG. 2) include the location check, asking security questions or other additional checking methods.

In FIG. 2, even this check failed, which was stated upon matching the requesting user's IP address with that of the user identity in step 214. Therefore, the service was denied from the user in step 214.

Naturally, the system can be configured to allow further identity checks in different ways.

FIG. 3 is an example of a database structure useful in an embodiment of the invention.

In the database, the use of the services are categorized by means of parameters and sub-parameters in manageable objects for example in a way described in FIG. 3.

One parameter might consist of a description of different aspects of using a series by successive numbers being a form of manageable objects. These might consist of e.g. 1) the device used for the service, 2) the device location for the use of the service, 3) the on-line time, 4) the time of the day, 5) the amount of money to be used/been used, 6) a $1^{st}$ category of visited site, 7) a $1^{st}$ category of purchased product/service, 8) a $2^{nd}$ category of visited site, and 9) a $2^{nd}$ category of purchased product/service.

The sub-parameters for these objects describing e.g. values for the parameters or more detailed information are described by sub-objects like e.g. those used by user I, i.e. 1.1) IPhone, 2.1.) home address, 3.1.) 1 h, 4.1.) 6 p.m., 5.1.) 50 Eur, 6.1.) Music store, 7.1.) CDs, 8.1.) news subscription, and 9.1.) Book, or by user II 1.2) Samsung Galaxy 2.2.) work address, 3.2.) 0.5 h, 4.2.) 1 p.m., 5.2.) 80 Eur, 6.2.) Game playing site, 7.2.) Tickets, 8.2.) Ticket store, and 9.2.) Electronics for music, or by user III II 1.3) HTC model X 2.3.) on the road, 3.3.) 15 min, 4.3.) 10 a.m., 5.3.) 200 Eur, 6.3.) Music site, 7.3.) Sport items, 8.3.) Social media site, and 9.3.) Sport socks. Optionally, these sub-parameters can be further described by different characteristics for type of music, colour of products, etc. by the means of manageable objects in the form of 1.1.1, 1.1.2 and so on.

Figure 4:
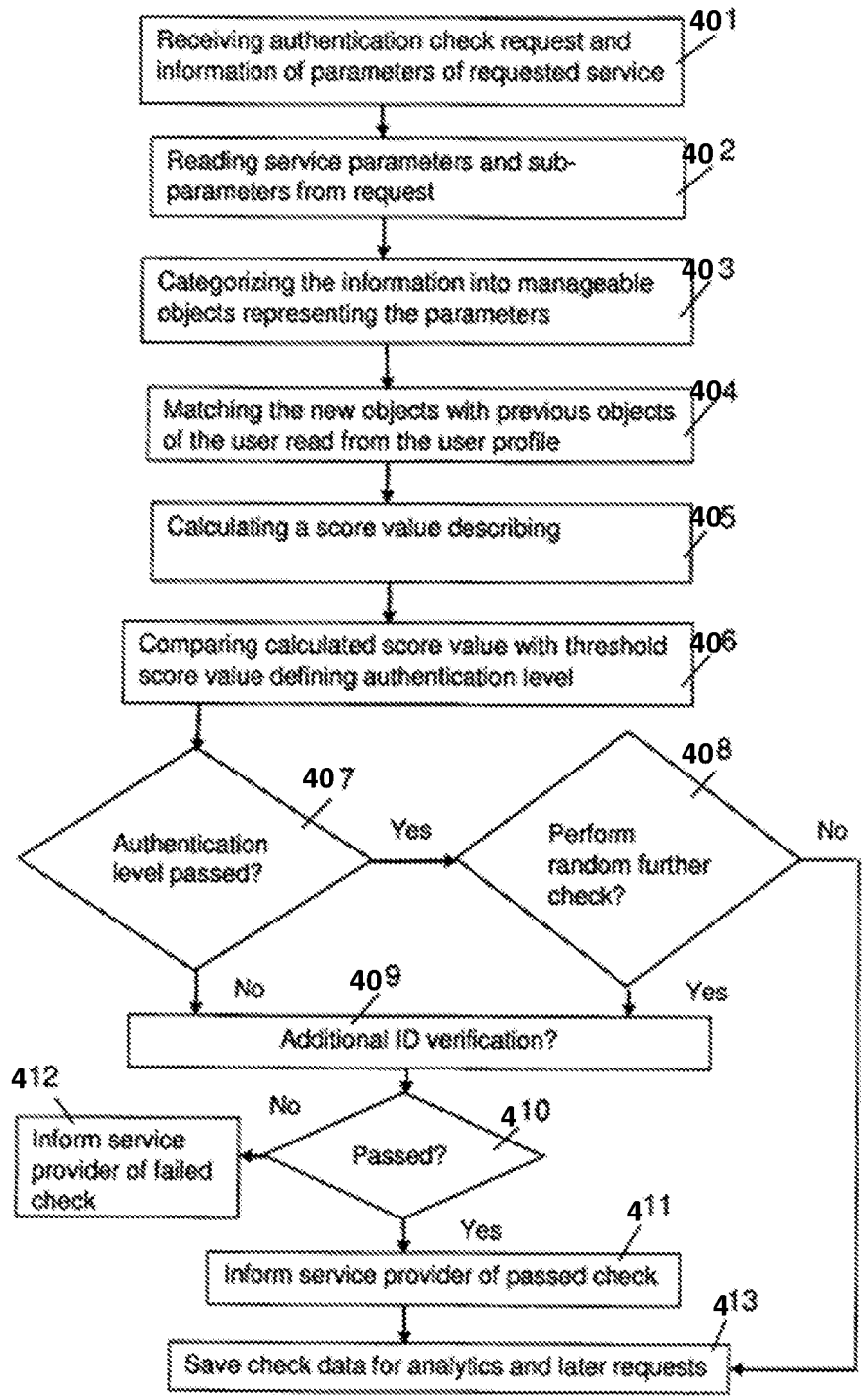
FIG. 4 is an example of a flow scheme, which presents the part of the invention calculating a score value.

FIG. 4 is a first example of an overall flow scheme of the part of the invention from the view of the authentication server for calculating a score value and using the score value for authentication purposes.

In step 401 of FIG. 4, the authentication server receives a request from a service provider to perform a further authentication check on an initial identity of a user. This request comprises information of the service and the parameters and sub-parameters of the service requested by the user.

The information in the request, which is read in step 402, comprises detailed data in the form of parameters and sub-parameters for e.g. the used device, the location of the used device, the visited site, the purchased product or service, and the price of the product or service. Preferably, the authentication server also notes the time of the day for the request.

The parameters and sub-parameters are preprocessed in a proper format so that they could be easily handled. Therefore, the authentication server categorizes the parameters and sub-parameters in the form of manageable objects having a proper format and stores the new data of the objects in the database in step 403.

The further authentication check is performed by the authentication server in step 404 by matching the current objects with previous objects collected for the user in the database.

A score value is calculated in step 405, which is based on matching the current objects with corresponding objects in the user profile and identifying lack or correspondence between current objects and existing objects in the user profile, including noting of new objects. Depending on how many parameters and sub-parameters matched (or mismatched), a given score value is then obtained. The extent of information in the user profile is not only dependent on how many recorded user actions there have been in order to collect as much information as possible but it depends on the user's data privacy settings with respect to what information is allowed to be collected and stored.

In step 406, the obtained core value is compared to a threshold score value, which defines the authentication level to pass for verification.

If the obtained score value to be compared is higher than or equal to the threshold score value, which is stated in step 407, the identity check is passed and it is considered in step 408 whether a random check for additional ID verification should be performed, which is an option in this example embodiment.

If the program of the service decides that a random check, indeed, is to be performed, then an additional ID verification is performed in step 409. This additional ID verification might consist of only one or several layers of additional checks (with different methods), either each of them to be passed or then a check of a further layer is performed only if the foregoing check was failed.

This additional Identity, ID, verification in step 409 is also performed if the authentication level was not passed in step 407.

If the additional ID verification/additional ID verifications of step 409 is passed in step 410 of FIG. 4, then the service provider is informed in step 411 of the passed check.

Step 411 is also performed if it is stated in step 408 by the program that that no random check need to be performed.

If again the additional ID verification/additional ID verifications of step 409 are not passed, in step 410 of FIG. 4, then the service provider is informed in step 412 of the failed check. After step 411 or step 412, the data of the checking procedure is saved by the authentications server for analytics and for collecting for information for following authorisation checks in a step 413.

Figure 5:
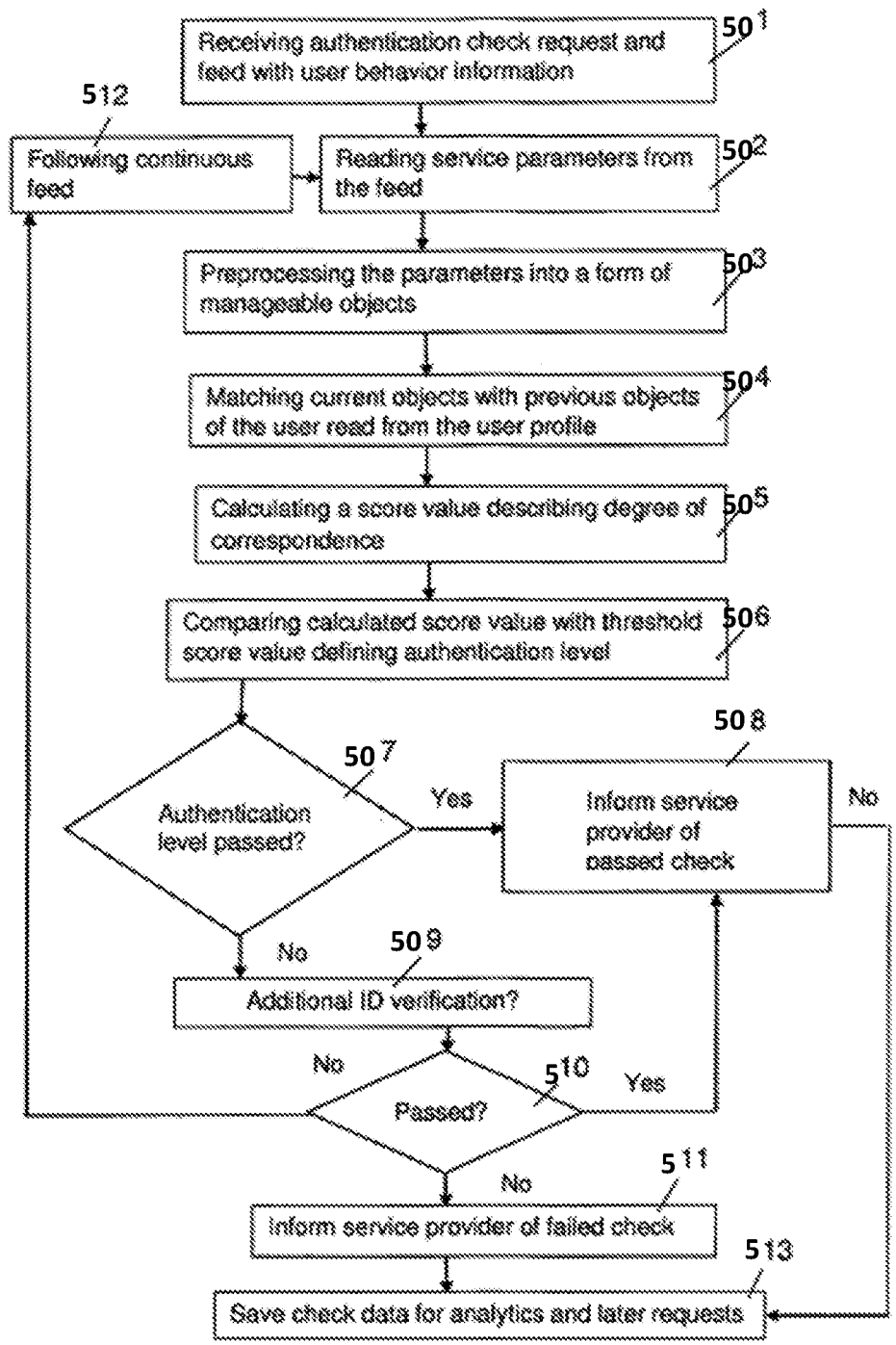
FIG. 5 is another example of a flow scheme, which presents the part of the invention calculating a score value.

FIG. 5 is another example of an overall flow scheme of the part of the invention from the view of the authentication server for calculating a score value and using the score value for both authentication and authorization purposes.

In step 501 of FIG. 5, the authentication server receives an authentication request from a service provider to perform a further authentication check on an initial identity of a user. This request comprises a feed of information of the service and the parameters of the service requested by the user. In addition, the authentication server receives in this embodiment a feed comprising user behavior information either as a one-time feed for this session or as a continuous feed (during the whole session) with new user behavior information, which the service provider collects during the authentication session for this service request for the continuous feed. Fresh user behavior information might e.g. be possible to collect if the user during the authentication session for this requested service meanwhile uses other services or is searching and/or clicking for information.

The parameters in the feed, which are read and extracted in step 502, comprises detailed data in the form of parameters and sub-parameters for e.g. the used device, the location of the used device, the visited site, the purchased product or service, and the price of the product or service. Preferably, the authentication server also notes the time of the day for the request.

The parameters and sub-parameters are preprocessed in a proper format so that they could be easily handled. For this purpose, the authentication server categorizes the parameters and sub-parameters in the form of manageable objects having a proper format and stores the new data of the objects in the database in step 503.

The further authentication check is performed by the authentication server in step 504 by matching the current objects with previous objects collected for the user in the database.

A score value is calculated in step 505, which is based on matching the current objects with corresponding objects in the user profile and identifying lack or correspondence between current objects and existing objects in the user profile, including noting of new objects. Depending on how many parameters and sub-parameters matched (or mismatched), a given score value is obtained. The extent of information in the user profile is not only dependent on how many recorded user actions there have been in order to collect as much information as possible but also depend on the user's data privacy settings with respect to what information is allowed to be available for the analysis and the matching.

In step 506, the obtained core value is compared to a threshold score value, which defines an authentication level to pass for verification.

Different threshold score values to use have been defined in advance as was presented in connection with FIG. 2. The threshold score value to be used in a certain situation does not only depend on a certain user since it might depend on the service to be used, and the parameters and sub-parameters of the requested service. Also different threshold score values might be required for different parts of the service and for different authorization levels. A higher authorization level in this context means more extensive rights to sue the different parts of the service. Therefore, there can be such rules implemented by the authentication server that the authorization level is raised along with a higher score value reached and lowered or dropped along with a lowered score value.

In some cases, a part of the requested service or services does not require a very high authentication level and are allowed to be used with a lower score value compared to another part, for the use of which higher security is required. In such case, the service provider either requires a higher score value or additional identity check steps, such as an IP address check or SMS messaging.

An example might be a service providing a discussion forum and both cheap and expensive products. The service provider for such a service might require higher authentication levels (and consequently higher score values) the more money is needed for the use of the actual part of service.

Another example is online games. Playing a game might require a low authentication level, but purchasing something with real money from the in-game store would require a higher authentication level.

If the obtained score value to be compared was higher than or equal to the threshold score value to be reached in step 507, the identity check is passed and the service provider is informed in step 508 of the passed check.

An additional Identity, ID, verification in step 509 might be performed if the authentication level was not passed in step 507. This additional ID verification might consist of only one or then several layers of additional checks (with different methods), either each of them to be passed or then a check of a further layer is performed only if the foregoing check was failed.

If the additional ID verification/additional ID verifications of step 509 was passed in step 510 of FIG. 5, then the service provider is informed in step 508 of the passed check.

If again the additional ID verification/additional ID verifications of step 509 was not passed in step 510 of FIG. 4, then the service provider is informed in step 511 of the failed check. As an alternative to immediately proceed to step 511 after a "no" in step 510, the authentication center might try to update the score value by following user behavior information in the continuous feed in step 512 and then proceed to step 502 and repeat the sequence of steps 502-508 maybe via steps 509 and 510 or by ending up to step 511.

As another alternative to immediately proceed to step 511 after a "no" in step 510, the authentication center might try to update the score value if a request from the user for a higher authorization level or a higher score has been received, whereby the authentication server returns to step 1 and performs steps 502-507 and maybe 508 or 511 again (maybe via steps 509 and 510) in such a way that in step 506, the current feed information that is compared with previously gained information stored in user profile.

After step 508 or step 511, the data of the checking procedure is saved by the authentication server for analysis and for collecting information for following authentication checks in a step 513.

It is pointed out that the above embodiments are examples only and are not meant to be restrictive for the implementation of the invention.

An additional feature to be implemented in the invention is that predictive algorithms can e.g. be used to assume user behavior in advance and to predict changes in user behavior and make sure of the predictions in the matching step.

The invention claimed is:

1. A method of user authentication in a telecommunication network including an authentication server with an authentication service, comprising
    providing previous behavior information of a user, wherein the previous behavior information of the user comprises at least one previous parameter used in one or more identity checks, and wherein the previous behavior information is based on previous behavior patterns of the user received and collected from one or more service providers in connection with the user's use of services provided by the one or more service providers, respectively, at least one of the one or more service providers including a prior service provider other than the authentication server;
    receiving, by the authentication server, a request including at least one user behavior data for an authentication of the user after one or more threshold score values have been selected for the user,
    the request for the authentication including an at least one parameter of at least one behavior of the user, wherein the user is requesting a service of a service provider,
    the authentication including:
    storing the at least one parameter of the at least one behavior of the user received during the authentication,
    performing a first identity check of the user for the authentication, the first identity check including:
        i) determining one or more score values based on the at least one parameter of the at least one behavior of the user and the previous behavior information of the user, and comparing the one or more score values with the one or more threshold score values to determine whether to pass the first identity check; and, based upon said comparing, selecting one of:
        iia) passing the user for the first identity check; or, in the alternative:
        iib) performing an additional identity check for a further authentication, further including checking of an identity of the user, if the first identity check of the user did not match with the one or more threshold score values for the user, by a score value different from one of the one or more score values.

2. The method of claim 1, wherein the telecommunication network further includes one or more service providers, and wherein a request for further authentication is received from a service provider and a result of a matching is sent to the same service provider that sent the request for further authentication.

3. The method of claim 1, wherein the at least one previous parameter of the user is based on previous behavior patterns of the user, received and collected from the one or more service providers, in connection with the user's use of services provided by the one or more service providers.

4. The method of claim 3, wherein a separate request for updating the score value on a basis of updated user behavior information from a continuous feed is sent.

5. The method of claim 3, further comprising updating a score value for the user during one session of further authentication on a basis of updated user behavior information from a continuous feed.

6. The method of claim 1, wherein the at least one previous parameter of the user is dynamically selected on a basis of availability.

7. The method of claim 1, wherein a score value of the further authentication is calculated on a basis of information correlated to a number of parameters matching previous behavior in relation to a number of parameters matching or mismatching previous behavior.

8. The method of claim 1, wherein deviations of one or more individual parameters are taken into consideration in a calculation of the score value of the further authentication.

9. The method of claim 1, further comprising selecting the one or more threshold score values representing an authentication level on a basis of how a service connected to is used.

10. The method of claim of claim 1, wherein the one or more threshold score values representing an authentication level is set by a service provider, a network operator providing at least one network connection for the user, or the use.

11. The method of claim 1, wherein the further authentication is combined with authorization of the user by specifying different access rights to different resources and services in the form of different authentication levels to pass defined by different threshold score values.

12. The method of claim 1, wherein the further authentication is performed by comparing an Internet Protocol (IP) address of the user received from the user's network operator with an Internet Protocol IP address received from a service provider, by security questions, by Short Message Service (SMS) verification, and/or by Interactive Voice Response (IVR) verification.

13. The method of claim 1, wherein in case the further authentication failed, a security reaction follows consisting in denying connection between a user device and a service provided by a service provider.

14. The method of claim 1, further comprising
wherein the additional identity check is performed by the authentication server by matching, with a user profile through employment of previous parameters of behavior of the user to respective current parameters of the user, and depending on how many parameters matched and/or mismatched, a score value is calculated defining a degree of correspondence between current parameters and previous parameters of behavior of the user.

15. The method of claim 14, wherein parameters of behavior of the user further comprise sub-parameters.

16. A system of user authentication in a telecommunication network, the system including an authentication server with an authentication service, and further comprising
a receiver configured to receive previous behavior information of a user, wherein the previous behavior information of the user comprises at least one previous parameter used in one or more identity checks, and wherein the previous behavior information is based on previous behavior patterns of the user received and collected from one or more service providers in connection with the user's use of services provided by the one or more service providers, respectively, at least one of the one or more service providers including a prior service provider other than the authentication server;
the receiver further configured to receive a request including at least one user behavior data for an authentication of the user after one or more threshold score values have been selected for the user,
the request for the authentication including an at least one parameter of at least one behavior of the user, wherein the user is requesting a service of a service provider,
the authentication server including:
a memory configured to store the at least one parameter of the at least one behavior of the user received during the authentication,
a non-transitory computer storage medium storing computer code, which when executed causes a computer processor to:
perform a first identity check of the user for the authentication, the first identity check including:
   i) determine one or more score values based on the at least one parameter of the at least one behavior of the user and the previous behavior information of the user, and comparing the one or more score values with the one or more threshold score values to determine whether to pass the first identity check; and, based upon said comparing, selecting one of:
      iia) pass the user for the first identity check; or, in the alternative:
      iib) perform an additional identity check for a further authentication, further including checking of an identity of the user, if the first identity check of the user did not match with the one or more threshold score values for the user, by a score value different from one of the one or more score values.

17. The system of claim 16, the telecommunication network further comprising one or more service providers, wherein the authentication server includes a receiver which receives a request for further authentication, including an at least one user behavior data for further authentication from a service provider and transmits a result of a matching to the same service provider that sent the request for further authentication.

18. The system of claim 16, wherein the authentication server is connected to a database with user profiles for each user and structured information of a use of services of users with relating data of the user and a user's way of using services, the structured information including data from use of services provided by different service providers.

19. The system of claim 18, wherein in the database, the structured information comprises data categorized by means of parameters and sub-parameters in manageable objects.

20. The system of claim 19, wherein an algorithm for matching parameters of the user is based on a number of matching parameters or sub-parameters versus mismatching parameters or sub-parameters or a percentage of matching parameters or subparameters.

21. The system of claim 16, wherein the user is one of a plurality of users, each user having a user profile, and wherein each user profile comprises one or more authentication levels to pass further comprising a threshold score value to reach for a given service.

22. The system of claim 16, further comprising
wherein the additional identity check is performed by the authentication server by matching, with a user profile through employment of previous parameters of behavior of the user to respective current parameters of the user, and depending on how many parameters matched and/or mismatched, a score value is calculated defining a degree of correspondence between current parameters and previous parameters of behavior of the user.

23. A non-transitory computer storage medium storing computer program code which causes a computer processor to employ authentication in a telecommunication network including an authentication server with an authentication service, which when the computer program code is executed by the computer processor causes the computer processor to:
provide previous behavior information of a user, wherein the previous behavior information of the user comprises at least one previous parameter used in one or more identity checks, and wherein the previous behavior information is based previous behavior patterns of the user received and collected from one or more service providers in connection with the user's use of services provided by the one or more service providers, respectively, at least one of the one or more service providers including a prior service provider other than the authentication server;
receive, by the authentication server, a request including at least one user behavior data for an authentication of the user after one or more threshold score values have been selected for the user, the request for the authentication including an at least one parameter of at least one behavior of the user, wherein the user is requesting a service of a service provider, the authentication server including the computer program code which is further configured to:

store the at least one parameter of the at least one behavior of the user received during the authentication, perform a first identity check of the user for the authentication, the first identity check including:
- i) determine one or more score values based on the at least one parameter of the at least one behavior of the user and the previous behavior information of the user, and comparing the one or more score values with the one or more threshold score values to determine whether to pass the first identity check, and, based upon said comparing, selecting one of:
  - iia) pass the user for the first identity check; or in the alternative:
  - iib) perform an additional identity check for a further authentication, further including checking of an identity of the user, if the first identity check of the user did not match with the one or more threshold score values for the user, by a score value different from one of the one or more score values.

* * * * *

UNITED STATES PATENT AND TRADEMARK OFFICE
CERTIFICATE OF CORRECTION

PATENT NO.       : 10,771,471 B2
APPLICATION NO.  : 15/295329
DATED            : September 8, 2020
INVENTOR(S)      : Juhana Enqvist and Jyrki Berg Page 1 of 1

It is certified that error appears in the above-identified patent and that said Letters Patent is hereby corrected as shown below:

In the Claims

In Claim 10, Column 17, Line 3, delete "use." and insert --user.--

In Claim 23, Column 18, Line 57, after --information is-- delete "based previous" and insert --based on previous--

Signed and Sealed this
Tenth Day of November, 2020

Andrei Iancu
*Director of the United States Patent and Trademark Office*